United States Patent
Le-Ngoc et al.

(10) Patent No.: US 9,762,299 B1
(45) Date of Patent: Sep. 12, 2017

(54) SYSTEM AND METHOD FOR SELF-INTERFERENCE SUPPRESSION STRUCTURE

(71) Applicants: Tho Le-Ngoc, Kanata (CA); James Gary Griffiths, Braeside (CA); Eddy Shi-Ning Hum, Ottawa (CA)

(72) Inventors: Tho Le-Ngoc, Kanata (CA); James Gary Griffiths, Braeside (CA); Eddy Shi-Ning Hum, Ottawa (CA)

(73) Assignee: Huawei Technologies Canada Co., Ltd., Kanata/Ontario ( * ) Notice: Subject to any disclaimer, the term of this patent is extended or adjusted under 35 U.S.C. 154(b) by 0 days.

(21) Appl. No.: 15/060,172

(22) Filed: Mar. 3, 2016

(51) Int. Cl.
*H04B 7/0413* (2017.01)
*H04B 1/10* (2006.01)
*H04B 1/04* (2006.01)

(52) U.S. Cl.
CPC .......... *H04B 7/0413* (2013.01); *H04B 1/0475* (2013.01); *H04B 1/10* (2013.01)

(58) Field of Classification Search
CPC ........ H04B 1/525; H04B 1/44; H04B 7/0894; H04B 1/0475; H04B 15/00; H04B 15/02; H04B 1/48; H04B 1/0042; H04B 1/123; H04B 7/0413; H04B 1/10; H04L 5/1461; H04L 27/2601; H04J 11/0023
See application file for complete search history.

(56) References Cited

U.S. PATENT DOCUMENTS

| | | | |
|---|---|---|---|
| 7,834,719 B2 | 11/2010 | Cheung et al. | |
| 7,855,617 B2 | 12/2010 | Cheung et al. | |
| 8,111,640 B2 | 2/2012 | Knox | |
| 9,136,883 B1* | 9/2015 | Moher | H04B 1/0042 |
| 2010/0048146 A1* | 2/2010 | McCallister | H04B 1/525 455/78 |
| 2013/0005284 A1* | 1/2013 | Dalipi | H03F 1/3229 455/114.3 |
| 2014/0204808 A1* | 7/2014 | Choi | H04L 5/1461 370/278 |
| 2015/0139347 A1 | 5/2015 | Murch et al. | |
| 2016/0094332 A1* | 3/2016 | Griffiths | H04B 1/109 370/278 |

FOREIGN PATENT DOCUMENTS

| | | |
|---|---|---|
| CN | 103297069 A | 9/2013 |
| CN | 104539341 A | 4/2015 |
| WO | 2013185106 A1 | 12/2013 |

OTHER PUBLICATIONS

Kim, Jeong-Geun, et al., "Improved Tx-to-Rx Isolation with Balanced Radar Front-end", 34th European Microwave Conference, Amsterdam, vol. 2, 2004.

Lim, Won-Gyu, et al., "Balanced circulator structure with enhanced isolation characteristics", Microwave and Optical Technology Letters, 50(9), pp. 2289-2391, Aug. 2008.

* cited by examiner

*Primary Examiner* — Vineeta Panwalkar

(57) ABSTRACT

A tapped delay line channel model may be employed to suppress the self-interference that is introduced, at a receiver input, by a signal at a transmitter output. The self-interference may be considered to have components introduced by the internal antenna subsystem of a full duplex MIMO transceiver.

17 Claims, 5 Drawing Sheets

SYSTEM AND METHOD FOR SELF-INTERFERENCE SUPPRESSION STRUCTURE

FIELD

The present application relates generally to self-interference suppression.

BACKGROUND

Full-duplex (FD) radio uses the same time and frequency resources for each direction in bidirectional communications. Conveniently, it may be shown that the spectral efficiency can be optimized and there is potential for doubling the capacity for a given resource. Because of potential benefits in the physical layers and other benefits in upper layers, FD radio has been considered one of the enabling technologies for future fifth generation (5G) wireless communication systems.

SUMMARY

A tapped delay line channel model may be employed to suppress self-interference that may be introduced, at a receiver input, by a signal at a transmitter output. The self-interference may be considered to have components introduced by an internal antenna subsystem of a full duplex MIMO transceiver.

According to an aspect of the present disclosure, there is provided a device for suppressing self-interference in a full duplex multiple input multiple output (MIMO) transceiver, the MIMO transceiver having a circulator-isolator. The device includes a first splitter, in a first side of the device, configured to receive a transmission signal and split the transmission signal into a first plurality of signals, an adjustable tapped delay line structure adapted to receive a subset of the first plurality of signals from the first splitter and a second plurality of signals from a second splitter in a second side of the device and a combiner configured to combine a third plurality of signals, at the output of the adjustable tapped delay line structure, into a single signal. The device further includes an output coupler configured to couple the single signal with output of the circulator-isolator, thereby suppressing elements of self-interference present in the output of the circulator-isolator.

According to a further aspect of the present disclosure, there is provided a method of suppressing self-interference in a full-duplex multiple input multiple output (MIMO) transceiver, the MIMO transceiver having a circulator-isolator. The method includes, at a first splitter, in a first side of the device: receiving a transmission signal; and splitting the transmission signal into a first plurality of signals. The method further includes, at an adjustable tapped delay line structure: receiving a subset of the first plurality of signals from the first splitter; and receiving a second plurality of signals from a second splitter in a second side of the device. The method further includes, at a combiner, combining, into a single signal, a third plurality of signals, at the output of the adjustable tapped delay line structure and, at an output coupler, coupling the single signal with output of the circulator-isolator, thereby suppressing elements of self-interference present in the output of the circulator-isolator.

According to another aspect of the present disclosure, there is provided a method of optimizing self-interference suppression. The method includes obtaining a reference SI-channel response and, based on the reference SI-channel response: initializing delay parameters; and initializing attenuation parameters. The method further includes transmitting the delay parameters to the plurality of variable delay units, transmitting the attenuation parameters to the plurality of variable attenuation units, obtaining an updated SI-channel responses and determining that the updated SI-channel response has not reached a pre-determined SI-suppression target. The method further includes, responsive to the determining, re-optimizing the delay parameters, thereby producing updated delay parameters and re-optimizing the attenuation parameters, thereby producing updated attenuation parameters, transmitting the updated delay parameters to the plurality of variable delay units and transmitting the updated attenuation parameters to the plurality of variable attenuation units. There is also provided an optimization processor adapted to carry out this method.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

Figure 1:
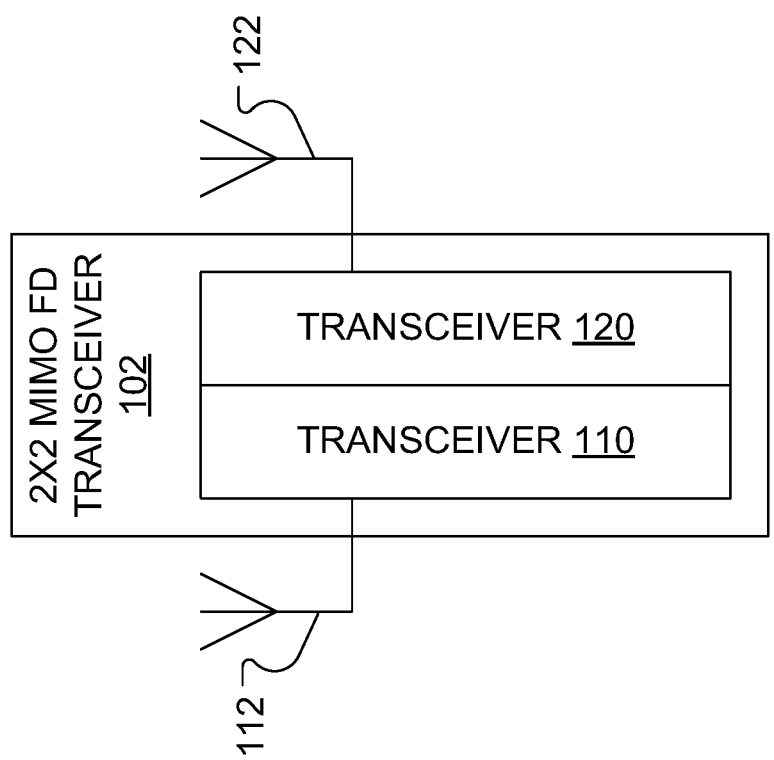
FIG. 1 illustrates an example FD transceiver arranged for 2×2 MIMO operation.

FIG. 1 illustrates an FD transceiver 102 arranged for an example 2×2 multiple-input, multiple-output (MIMO) operation. The 2×2 MIMO FD transceiver 102 includes a first transceiver 110 operable to transmit and receive using a first antenna 112. The 2×2 MIMO FD transceiver 102 also includes a second transceiver 120 operable to transmit and receive using a second antenna 122. As will be understood, the 2×2 MIMO structure of the 2×2 MIMO FD transceiver 102 of FIG. 1 is merely presented as an example and the number of antennas is entirely configurable.

Figure 2:
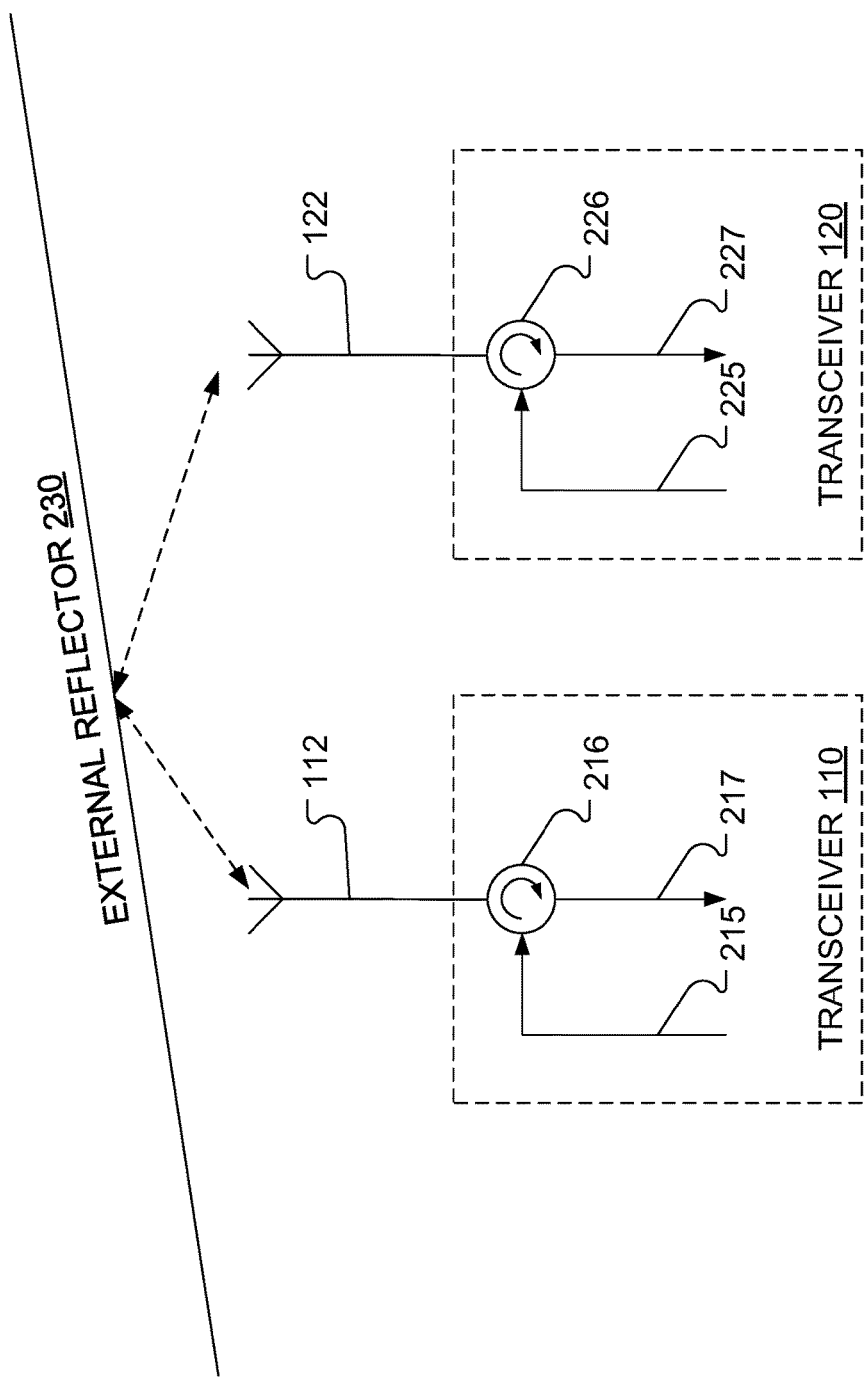
FIG. 2 illustrates elements of an internal antenna subsystem for the example 2×2 MIMO FD transceiver of FIG. 1.

FIG. 2 illustrates elements of an internal antenna subsystem for the FD transceiver 102 of FIG. 1. In particular, FIG. 2 illustrates the two transceivers: the first transceiver 110 (with the first antenna 112 connected to a common port of a first circulator 216); and the second transceiver 120 (with the second antenna 122 connected to a common port of a second circulator 226). A first output signal 215, for transmission by the first antenna 112, is connected to a transmit (Tx) port of the first circulator 216 while a first input signal 217, as received by the first antenna 112, is connected to the receive (Rx) port of the first circulator 216. Similarly, a second output signal 225, for transmission by the second antenna 122, is connected to a transmit (Tx) port of the second circulator 226 while a second input signal 227, as received by the second antenna 122, is connected to a receive (Rx) port of the second circulator 226.

One challenge for designers of FD-capable devices (e.g., the FD transceiver 102 of FIG. 1) is how to effectively suppress the self-interference (SI). SI is generated from the output signals 215, 225 to the input signals 217, 227 of the same FD transceiver, and can be considered to have at least four components.

One component is known as "internal leakage." Internal leakage may be considered to arise due to imperfect isolation between the Tx and Rx sides of the first circulator 216 and between the Tx and Rx sides of the second circulator 226.

Another component is known as "internal cross-coupling." Internal cross-coupling may be considered to arise, for example, between the first output signal 215 and the second input signal 227, and between the second output signal 225 and the first input signal 217.

A further component is known as "internal reflection." Internal reflection may be considered to arise due to antenna impedance mismatch. In an ideal scenario, the output signals 215, 225 transmitted via the two transmit antennas 112, 122 would be perfectly radiated without reflection. However, due to impedance mismatch, parts of transmitted power are reflected back and become part of the first input signal 217 and the second input signal 227 via the first circulator 216 and the second circulator 226, respectively.

A still further component is known as "external reflections." External reflections may be considered to arise due to signal propagation in the surrounding environment in which the FD transceiver 102 is situated.

High front-end Tx-Rx isolation of FD transceiver is needed to prevent low noise amplifier (LNA) not to be saturated from high SI power level.

Required wide bandwidth and high isolation level are challenge parameters in FD radio frequency front-end design.

The term "channel" refers to a medium between a source and a destination. The characteristics of wireless signal change as the wireless signal travels, via the channel, from the source to the destination. These characteristics depend upon, among others: the distance between the source and the destination; the path(s) taken by the wireless signal; and the environment around the path(s). The profile of a received signal can be obtained from the profile of the transmitted signal if the channel model is known.

The three key components of the channel are path loss, shadowing and multipath interference. The impulse response of a multipath channel can be represented as a linear combination of a number of impulses with different time-varying delays and amplitudes. The corresponding channel can be modeled as a tapped delay line (TDL) that is a linear combination of a number of delayed taps with various delay elements and different coefficients.

It is proposed herein to employ a TDL channel model to construct the estimated counterparts of the self-interferences (SI) that are introduced by the output signals 215, 225 to the input signals 217, 227. Once the counterparts of the SI are estimated, the counterparts may be used for SI-suppression.

In overview, suppression of the SI present in the input signals 217, 227 relies, in part, on a priori knowledge of the output signals 215, 225. By modeling the SI-channel (i.e., the channel through which the output signals 215, 225 are undesirably coupled to become part of the input signals 217, 227 as SI), an approximation of anticipated SI can be generated and then suppressed.

It is proposed herein to model the SI-channel as a TDL with a few dominating paths that represent the internal leakage, the internal cross-coupling and the internal reflection. These three components of the SI are generated due to the internal front-end structure of the FD transceiver 102, so that they have shorter delays and stronger coefficients and, hence, are dominant. It may be shown that ignoring the remaining paths does not have a significant impact on the accuracy of the model.

Given that the SI-channel is highly influenced by the internal front-end structure of the 2×2 MIMO FD transceiver 102, the SI channel model may be simplified to have only a few, short-delay, dominating paths. These short-delay, dominating paths may be considered to be relatively slowly time-varying due to the quasi-static characteristics of the internal front-end structure of the 2×2 MIMO FD transceiver 102.

It is proposed herein to use an adjustable (but not adaptive) TDL structure with different programmable delays and coefficients at a high precision to arrive at an estimated SI signal so that, in a first stage of an SI suppression process, the estimated SI signal can be used to suppress actual SI. The TDL structure may be seen to mimic the SI channel with the short-delay dominating paths. Note that, while the TDL structure has been conceived as an analog TDL structure, implementation as a digital TDL structure has been contemplated.

The remaining components of the SI, which are likely due to external reflections, may be considered to be more time-varying. Accordingly, it is proposed to suppress the remaining components of the SI in further stages of the SI suppression process. As will be discussed hereinafter, a second SI suppression stage may be called an RF stage and a third SI suppression stage may be called a baseband stage. Conveniently, given that the remaining components may be more time-varying, the second and third stages may employ adaptive suppression techniques.

The SI suppression RF stage can be implemented by using adaptive digital signal processing. The channel of the residual SI (after the first SI suppression stage) may be considered to be mainly due to the remaining time-varying multipath external reflections. It is proposed herein to model the residual SI as a digital multi-tap transversal symbol-spaced filter with adaptive coefficients. Maximum-Likelihood (ML) and Least-Squares (LS) are example algorithms that can be used to compute the adaptive coefficients. Taking the known transmitted symbols/signals as inputs, the adaptive digital multi-tap transversal symbol-spaced filter can generate an estimated residual SI for further suppression.

The SI suppression baseband stage can be implemented by using adaptive digital signal processing. The channel of further residual SI (after the first and second SI suppression stages) can also be modeled as a digital multi-tap transversal symbol-spaced filter with adaptive coefficients. Maximum-Likelihood (ML) and Least-Squares (LS) are example algorithms that can be used to compute these adaptive coefficients. Taking the known transmitted symbols/signals as inputs, the adaptive digital multi-tap transversal symbol-spaced filter can generate an estimated further residual SI for further suppression at the baseband.

Figure 3:
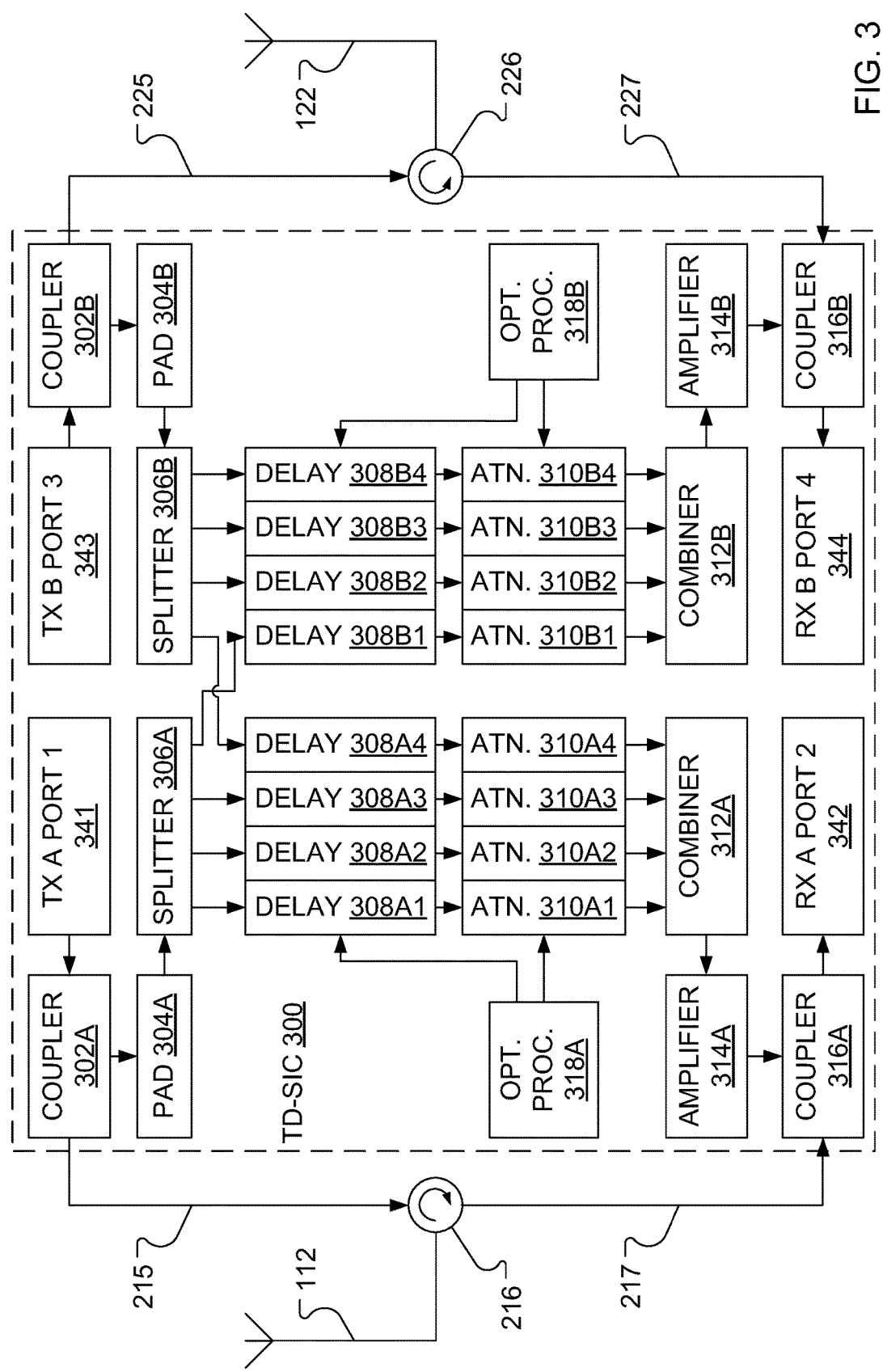
FIG. 3 illustrates a tapped-delay radio frequency self-interference structure for the example 2×2 MIMO FD transceiver of FIG. 1, in accordance with aspects of the present application.

FIG. 3 illustrates a tapped-delay radio frequency (RF) self-interference structure (TD-SIC) 300 for a 2×2 MIMO transceiver (such as the 2×2 MIMO FD transceiver 102 of FIG. 1) in accordance with aspects of the present application. The TD-SIC 300 is represented as a four-port device with an "A" side and a "B" side. The A side connects the first output signal 215 to the first circulator 216 via a first transmission (TX) port (Tx A port 1) 341 and a first A-side coupler 302A and connects the first input signal 217 from the first circulator 216 to a first reception (RX) port (Rx A port 2) 342 via a second A-side coupler 316A. The first antenna 112 is connected to the first circulator 216. The B side connects the second output signal 225 to the second circulator 226 via a second transmission (TX) port (Tx B port 3) 343 and a first B-side coupler 302B and connects the second input signal 227 from the second circulator 226 to a second reception (RX) port (Rx B port 4) 344 via a second B-side coupler 316B. The second antenna 122 is connected to the second circulator 226.

On the A side of the TD-SIC 300, a low-power portion of the transmission signal from the first TX port 341 is extracted from the first A-side coupler 302A and connected to an optional first pad 304A. The first pad 304A can help to enhance the impedance matching.

Output from the first pad 304A is passed to a first splitter 306A. The first splitter 306A acts to split the output from the first pad 304A into a number, n, of paths. In the example TD-SIC 300 of FIG. 3, n=4.

Each of a further number, m, of the n paths from the first splitter 306A is received at one of m first variable delay units. In the example TD-SIC 300 of FIG. 3, m=3. The first variable delay units are labeled, in FIG. 3, with reference numerals 308A1, 308A2, 308A3 and 308A4 (collectively or individually 308A). Each of the first variable delay units 308A is set with an adjustable delay parameter by a first optimization processor 318A such that each of the first variable delay units 308A outputs a delayed version of a signal received from the first splitter 306A in accordance with the adjustable delay parameter. The first optimization processor 318A may include a microprocessor (not shown) and a memory (not shown) storing instructions for the first optimization processor 318A.

Output from each of the n first variable delay units 308A is received at a corresponding one of n first variable attenuation units. The first variable attenuation units are labeled, in FIG. 3, with reference numerals 310A1, 310A2, 310A3 and 310A4 (collectively or individually 310A). Each of the first attenuation units 310A is set with an adjustable attenuation parameter by the first optimization processor 318A such that each of the first attenuation units 310A outputs an attenuated version of the signal received from the corresponding first variable delay unit 308A in accordance with the adjusted attenuation parameter.

Output from each of the n first variable attenuation units 310A is received at a first combiner 312A. The first combiner 312A passes a combination of the n outputs to a first amplifier 314A. Output from the first amplifier 314A is received at a first output coupler 316A along with the first input signal 217 from the first circulator 216. Output from the first output coupler 316A exits the A side of the TD-SIC 300 at the first RX port 342.

Similarly, on the B side of the TD-SIC 300, a low-power portion of the transmission signal from the second TX port 343 is extracted from the first B-side coupler 302b and connected to an optional second pad 304b. The second pad 304b can help to enhance the impedance matching.

Output from the second pad 304b is passed to a second splitter 306b. The second splitter 306b acts to split the output from the second pad 304b into a number, n, of paths. In the example TD-SIC 300 of FIG. 3, n=4.

Each of a further number, m, of the n paths from the second splitter 306B is received at one of m second variable delay units. In the example TD-SIC 300 of FIG. 3, m=3. The second variable delay units are labeled, in FIG. 3, with reference numerals 308B1, 308B2, 308B3 and 308B4 (collectively or individually 308B). Each of the second variable delay units 308B is set with an adjustable delay parameter by a second optimization processor 318B such that each of the second variable delay units 308B outputs a delayed version of a signal received from the second splitter 306B in accordance with the adjusted delay parameter. The second optimization processor 318B may include a microprocessor (not shown) and a memory (not shown) storing instructions for the second optimization processor 318B.

Output from each of the n second variable delay units 308B is received at a corresponding one of n second variable attenuation units. The second variable attenuation units are labeled, in FIG. 3, with reference numerals 310B1, 310B2, 310B3 and 310B4 (collectively or individually 310B). Each of the second attenuation units 310B is set with an adjustable attenuation parameter by the second optimization processor 318A such that each of the second attenuation units 310B outputs an attenuated version of the signal received from the corresponding second variable delay unit 308B in accordance with the adjusted attenuation parameter.

Output from each of the n second variable attenuation units 310B is received at a second combiner 312B. The second combiner 312B passes a combination of the n outputs to a second amplifier 314B. Output from the second amplifier 314B is received at a second output coupler 316B along with the second input signal 227 from the second circulator 226. Output from the second output coupler 316B exits the B side of the TD-SIC 300 at the second RX port 344.

As discussed hereinbefore, each of m of the n paths from the first splitter 306A is received at one of m first variable delay units 308A on the A side of the TD-SIC 300. Each of the remaining n-m of the n paths from the first splitter 306A is received at one of n-m second variable delay units 308B on the B side of the TD-SIC 300. Similarly, each of m of the n paths from the second splitter 306B is received at one of m first variable delay units 308B on the B side of the TD-SIC 300. Each of the remaining n-m of the n paths from the second splitter 306B is received at one of n-m first variable delay units 308A on the A side of the TD-SIC 300.

In operation, each of n paths is passed through one of the variable delay units 308A, 308B followed by one of the variable attenuation units 310A, 310B.

At the combiners 312A, 312B, m path outputs of one side of the TD-SIC 300 are combined with (n-m) path outputs of the other side of the TD-SIC 300. The output of the combiners 312A, 312B is amplified, at the amplifiers 314A, 314B, to produce an SI replica. At the output couplers 316A, 316B, the amplified SI replica is coupled with the input signal 217, 227 received from the corresponding circulator 216, 217, thereby suppressing, to some extent, the SI present in the signal received from the corresponding circulator 216, 217. The SI suppressed signal is then output on the appropriate one of the RX ports 342, 344.

Figure 4:
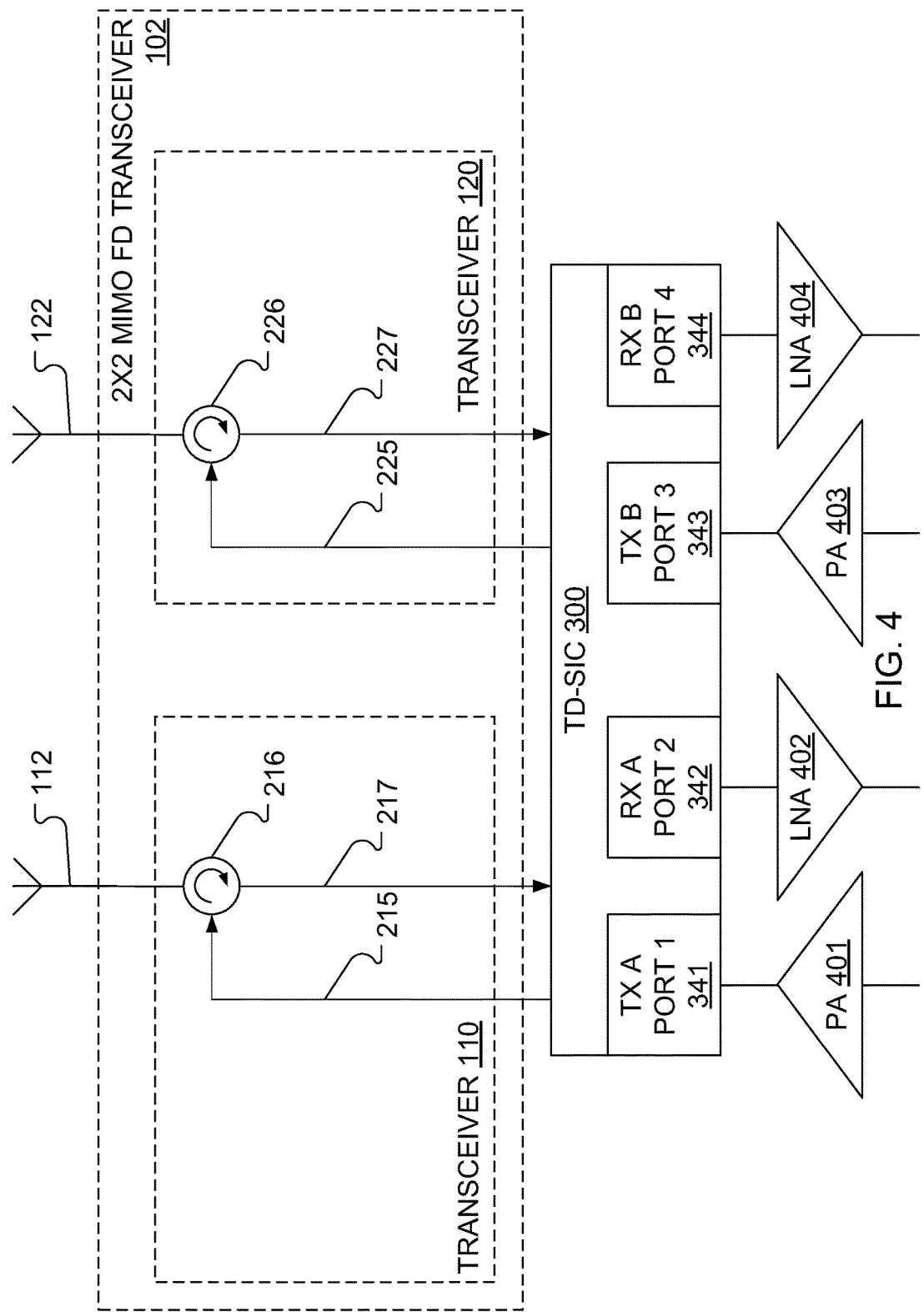
FIG. 4 illustrates the tapped-delay radio frequency self-interference structure of FIG. 3 in combination with the internal antenna subsystem of FIG. 2, in accordance with aspects of the present application.

FIG. 4 illustrates the connections between the TD-SIC 300 and the 2×2 MIMO FD transceiver 102 of FIG. 1. The connections between the TD-SIC 300 and the two antennas 112, 122 via the corresponding circulators 216, 226 are previously shown in FIGS. 2 and 3. The first Tx port 341 is connected to an output of a first Tx power amplifier (PA) 401 and the second Tx port 343 is connected to an output of a second Tx PA 403. The first Rx port 342 is connected to an input of a first Rx low noise amplifier (LNA) 402 and the second Rx port 344 is connected to an input of Rx LNA 404.

The optimization processors 318A, 318B implement an optimization algorithm to adjust the variable delay units 308A, 308B and the variable attenuation units 310A, 310B to optimize the SI suppression.

The major part of the optimization processor 318A, 318B is usually implemented as a unit of the 2×2 MIMO FD transceiver 102, external to the TD-SIC 300, to efficiently share the available digital signal processing and computing facilities and access to the received baseband signals to measure the SI-channel responses.

Figure 5:
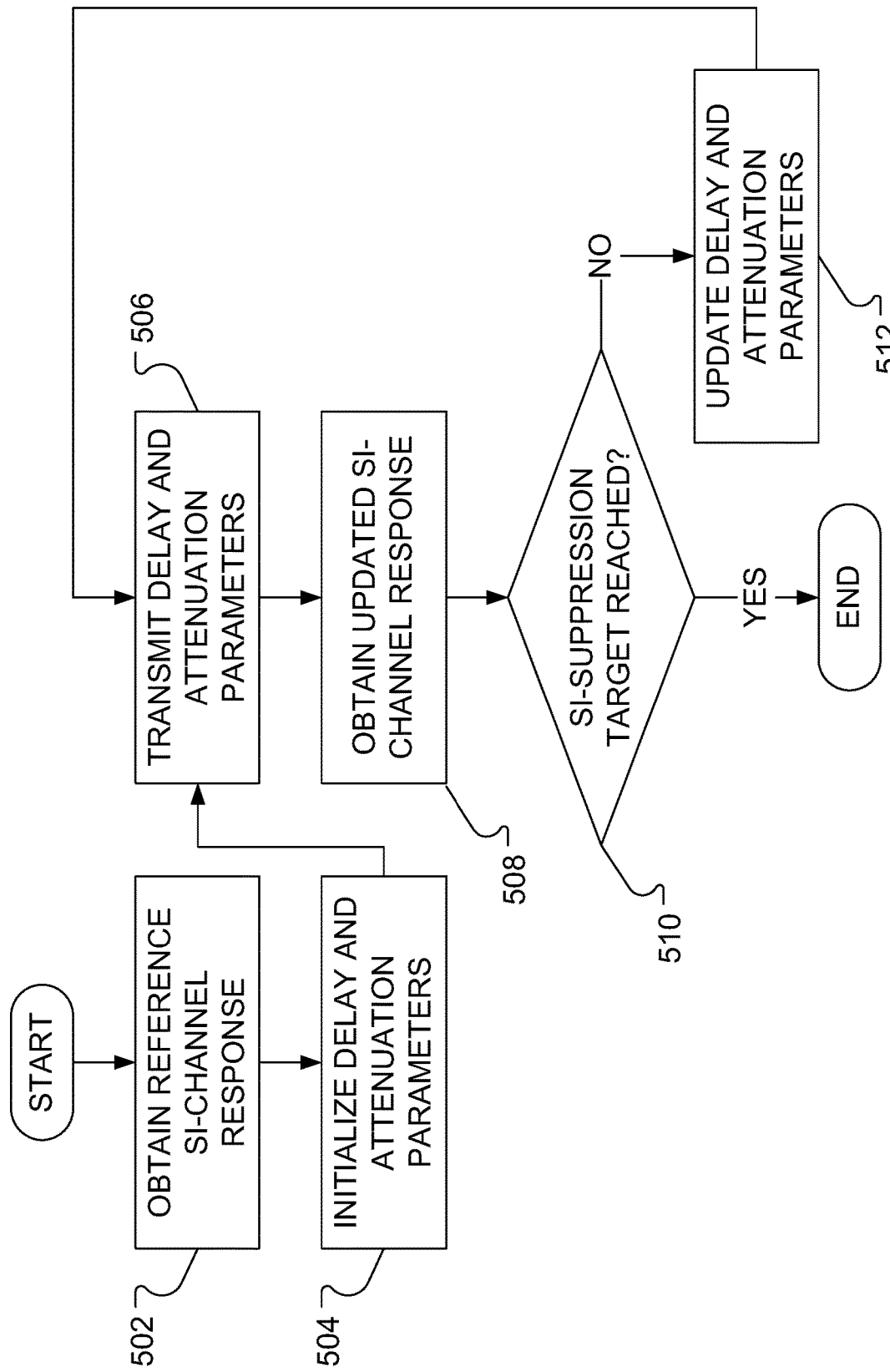
FIG. 5 illustrates example steps in a method of optimizing self-interference suppression in the tapped-delay radio frequency self-interference structure of FIG. 3 in accordance with aspects of the present application.

FIG. 5 illustrates example steps in a method of optimizing self-interference suppression in the TD-SIC 300 of FIG. 3. Initially, the optimization processor 318 obtains (step 502) a reference SI-channel response, that is, the SI-channel response before employing the TD-SIC 300. Based on the reference SI-channel response, the optimization processor 318 determines (step 504) initial values for the delay parameters and the attenuation parameters. The optimization processor 318 transmits (step 506) the delay parameters to the variable delay units 308A, 308B and transmits (step 506) the attenuation parameters to the variable attenuation units 310A, 310B. The optimization processor 318 then obtains (step 508) and updated SI-channel response, that is, the SI-channel response when the TD-SIC 300 is employed with the delay parameters and the attenuation parameters transmitted to the appropriate units in step 506. The optimization processor 318 then determines (step 510) whether the updated SI-channel response has reached a pre-determined SI-suppression target. Upon determining (step 510) that the updated SI-channel response has reached the pre-determined SI-suppression target, the method of optimizing self-interference suppression may be considered to be complete. Upon determining (step 510) that the updated SI-channel response has not reached the pre-determined SI-suppression target, the optimization processor 318 then re-optimizes the parameters, thereby updating (step 512) the delay parameters and the attenuation parameters. The optimization processor 318 then transmits (step 506) the updated delay parameters to the variable delay units 308A, 308B and transmits (step 506) the updated attenuation parameters to the variable attenuation units 310A, 310B.

The proposed structure for the TD-SIC 300 shown in FIG. 3 for the example 2×2 MIMO FD transceiver system 102 is scalable and can be extended for any N×N or N×M MIMO system for N,M=1, 2, 3, . . . .

The proposed structure for the TD-SIC 300 can be integrated with an antenna sub-system, as shown in FIG. 1, FIG. 2 and FIG. 3, to offer relatively high isolation between transmitter and receiver, as is preferred for FD operation.

Indeed, the proposed structure for the TD-SIC 300 can be applied to any wireless N×N or N×M MIMO transceiver to offer high isolation between transmitter and receiver, as is preferred for FD operation.

The proposed structure for the TD-SIC 300 can be shown to offer high SI-suppression at RF prior to the LNAs 402, 404, as may be understood to be sufficient for FD operation without further SI suppression in small cells. For higher Tx-Rx isolation requirements, the proposed structure for the TD-SIC 300 can be used in conjunction with second RF and/or third baseband SI suppression stages to increase the SI suppression and, in this case, the high Tx-Rx isolation offered by the proposed structure TD-SIC 300 may be seen to help to simplify the design of the second and/or third SI suppression stages.

It is known that an isolator (a two-port device) may be constructed based on a circulator (a three-port device) by terminating the third port of the circulator. Although the preceding discussion is presented in the context of the first antenna 112 being associated with the first circulator 216 and the second antenna 122 being associated with the second circulator 226. It should be clear that aspects of the present application may apply equally to cases wherein the first antenna 112 is associated with a first isolator (not shown) and the second antenna 122 is associated with a second isolator (not shown). Indeed, such isolators may be integrated with their respective antennas 112, 122. For one example, a dual-polarized antenna may be used as one antenna and the two ports can be assigned for transmission and reception, respectively, so that isolation is provided by internal dual-polarization. For another example, a three-port impedance matching device may be integrated with an antenna so that there are only two ports, one for transmission and one for reception, with an antenna port being embedded with the antenna. Generically, we may reference a circulator-isolator.

The above-described implementations of the present application are intended to be examples only. Alterations, modifications and variations may be effected to the particular implementations by those skilled in the art without departing from the scope of the application, which is defined by the claims appended hereto.

What is claimed is:

1. A device for suppressing self-interference (SI) in a full-duplex multiple input multiple output (MIMO) transceiver, the device comprising:
    a first splitter configured to receive a first transmission signal and split the first transmission signal into a first plurality of signals;
    a second splitter configured to receive a second transmission signal and split the second transmission signal into a second plurality of signals;
    a first adjustable tapped delay line structure adapted to receive a first subset of the first plurality of signals from the first splitter and a second subset of the second plurality of signals from the second splitter;
    a second adjustable tapped delay line structure adapted to receive a third subset, different from the first subset, of the first plurality of signals from the first splitter and a fourth subset, different from the second subset, of the second plurality of signals from the second splitter;
    a first combiner configured to combine output of the first adjustable tapped delay line structure into a first combined signal;
    a second combiner configured to combine output of the second adjustable tapped delay line structure into a second combined signal;
    a first output coupler configured to couple the first combined signal with output of a first circulator-isolator, output of the first output coupler being provided to a first reception port; and
    a second output coupler configured to couple the second combined signal with output of a second circulator-isolator, output of the second output coupler being provided to a second reception port.

2. The device of claim 1 further comprising an optimization processor configured to adjust the first adjustable tapped delay line structure to optimize suppression of elements of SI.

3. The device of claim 2 wherein the first adjustable tapped delay line structure comprises:
    a plurality of variable delay units, each variable delay unit of the plurality of variable delay units configured to receive a delay parameter and output a delayed version of a received signal in accordance with the delay parameter; and a plurality of variable attenuation units corresponding to the plurality of variable delay units, each plurality of variable attenuation unit of the plurality of variable attenuation units configured to receive an attenuation parameter and output an attenuated version of a received signal in accordance with the attenuation parameter.

4. The device of claim 3 wherein the plurality of variable delay units of the first adjustable tapped delay line structure are configured to receive the delay parameters from the optimization processor.

5. The device of claim 3 wherein the plurality of variable attenuation units of the first adjustable tapped delay line structure are configured to receive the attenuation parameters from the optimization processor.

6. The device of claim 3 wherein the optimization processor is configured to optimize suppression of the elements of SI by:
transmitting the delay parameters to the plurality of variable delay units;
transmitting the attenuation parameters to the plurality of variable attenuation units;
obtaining an updated SI-channel response;
determining that the updated SI-channel response has not reached a pre-determined SI-suppression target;
responsive to the determining, re-optimizing the delay parameters to produce updated delay parameters;
responsive to the determining, re-optimizing the attenuation parameters to produce updated attenuation parameters;
transmitting the updated delay parameters to the plurality of variable delay units; and
transmitting the updated attenuation parameters to the plurality of variable attenuation units.

7. The device of claim 1 further comprising an amplifier configured to amplify the first combined signal before the first combined signal is received by the output coupler.

8. The device of claim 1 wherein the first adjustable tapped delay line structure comprises an analog adjustable tapped delay line structure.

9. A method of suppressing self-interference (SI) in a full-duplex multiple input multiple output (MIMO) transceiver, the method comprising:
at a first splitter:
receiving a first transmission signal; and
splitting the first transmission signal into a first plurality of signals;
at a second splitter:
receiving a second transmission signal; and
splitting the second transmission signal into a second plurality of signals;
at a first adjustable tapped delay line structure:
receiving a first subset of the first plurality of signals from the first splitter; and
receiving a second subset of a second plurality of signals from the second splitter;
at a second adjustable tapped delay line structure:
receiving a third subset, different from the first subset, of the first plurality of signals from the first splitter; and
receiving a fourth subset, different from the second subset, of the second plurality of signals from the second splitter;
at a first combiner, combining, into a first combined signal, output of the first adjustable tapped delay line structure;
at a second combiner, combining, into a second combined signal, output of the second adjustable tapped delay line structure;
at a first output coupler, coupling the first combined signal with output of a first circulator-isolator, and providing output of the first output coupler to a first reception port; and
at a second output coupler, coupling the second combined signal with output of a second circulator-isolator, and providing output of the second output coupler to a second reception port.

10. The method of claim 9 further comprising, at an optimization processor, adjusting the first adjustable tapped delay line structure to optimize suppression of elements of SI.

11. The method of claim 10 wherein the first adjustable tapped delay line structure comprises a plurality of variable delay units and a plurality of variable attenuation units corresponding to the plurality of variable delay units, the method further comprising:
at each variable delay unit of the plurality of variable delay units:
receiving a delay parameter; and
outputting a delayed version of a received signal in accordance with the delay parameter;
at each plurality of variable attenuation unit of the plurality of variable attenuation units:
receiving an attenuation parameter; and
outputting an attenuated version of a received signal in accordance with the attenuation parameter.

12. The method of claim 11 further comprising, at the plurality of variable delay units of the first adjustable tapped delay line structure, receiving the delay parameters from the optimization processor.

13. The method of claim 11 further comprising, at the plurality of variable attenuation units of the first adjustable tapped delay line structure, receiving the attenuation parameters from the optimization processor.

14. The method of claim 11 further comprising, at the optimization processor, optimizing suppression of the elements of SI by:
transmitting the delay parameters to the plurality of variable delay units;
transmitting the attenuation parameters to the plurality of variable attenuation units;
obtaining an updated SI-channel response;
determining that the updated SI-channel response has not reached a particular SI-suppression target;
responsive to the determining, re-optimizing the delay parameters to produce updated delay parameters;
responsive to the determining, re-optimizing the attenuation parameters to produce updated attenuation parameters;
transmitting the updated delay parameters to the plurality of variable delay units; and
transmitting the updated attenuation parameters to the plurality of variable attenuation units.

15. The method of claim 9 further comprising, at an amplifier:
amplifying the first combined signal to generate an amplified single signal; and
providing the amplified single signal to the first output coupler.

16. A method of optimizing self-interference (SI) suppression, the method comprising:
  obtaining a reference SI-channel response;
  based on the reference SI-channel response:
    initializing delay parameters;
    initializing attenuation parameters;
  transmitting the delay parameters to a plurality of variable delay units;
  transmitting the attenuation parameters to a plurality of variable attenuation units;
  obtaining an updated SI-channel response;
  determining that the updated SI-channel response has not reached a pre-determined SI-suppression target;
  responsive to the determining:
    re-optimizing the delay parameters to produce updated delay parameters; and
    re-optimizing the attenuation parameters to produce updated attenuation parameters;
  transmitting the updated delay parameters to the plurality of variable delay units; and
  transmitting the updated attenuation parameters to the plurality of variable attenuation units.

17. An optimization processor for optimizing self-interference (SI) suppression, the optimization processor comprising:
  memory storing instructions; and
  a processor configured, by the instructions, to:
    obtain a reference SI-channel response;
    based on the reference SI-channel response:
      initialize delay parameters; and
      initialize attenuation parameters;
    transmit the delay parameters to a plurality of variable delay units;
    transmit the attenuation parameters to a plurality of variable attenuation units;
    obtain an updated SI-channel response;
    determine that the updated SI-channel response has not reached a pre-determined SI-suppression target;
    responsive to the determining:
      re-optimize the delay parameters to produce updated delay parameters; and
      re-optimize the attenuation parameters to produce updated attenuation parameters;
    transmit the updated delay parameters to the plurality of variable delay units; and
    transmit the updated attenuation parameters to the plurality of variable attenuation units.

* * * * *